US012228152B2

(12) United States Patent
Song et al.

(10) Patent No.: US 12,228,152 B2
(45) Date of Patent: Feb. 18, 2025

(54) PILOT PROPORTIONAL CONTROL VALVE APPARATUS, AUTOMATIC CALIBRATION METHOD AND MEDIUM

(71) Applicant: XUZHOU XCMG EXCAVATOR MACHINERY CO., LTD, Jiangsu (CN)

(72) Inventors: Zhike Song, Jiangsu (CN); Jiawen Geng, Jiangsu (CN); Shuicong Li, Jiangsu (CN); Dongdong Niu, Jiangsu (CN); Lu Wang, Jiangsu (CN)

(73) Assignee: XUZHOU XCMG EXCAVATOR MACHINERY CO., LTD, Jiangsu (CN)

( * ) Notice: Subject to any disclaimer, the term of this patent is extended or adjusted under 35 U.S.C. 154(b) by 0 days.

(21) Appl. No.: 18/276,465

(22) PCT Filed: Sep. 27, 2021

(86) PCT No.: PCT/CN2021/120917
§ 371 (c)(1),
(2) Date: Aug. 9, 2023

(87) PCT Pub. No.: WO2022/205815
PCT Pub. Date: Oct. 6, 2022

(65) Prior Publication Data

US 2024/0117826 A1 Apr. 11, 2024

(30) Foreign Application Priority Data

Mar. 29, 2021 (CN) ........................ 202110333712.5

(51) Int. Cl.
*F15B 19/00* (2006.01)
*F15B 13/02* (2006.01)

(52) U.S. Cl.
CPC .......... *F15B 19/002* (2013.01); *F15B 13/025* (2013.01); *F15B 19/00* (2013.01);
(Continued)

(58) Field of Classification Search
CPC .................. F15B 19/002; F15B 13/025; F15B 2211/50554; F15B 2211/513;
(Continued)

(56) References Cited

U.S. PATENT DOCUMENTS 8,731,727 B2 * 5/2014 Toppari .............. G05D 16/2026 700/282
9,598,841 B2 * 3/2017 Ikegami ................ E02F 9/2271
10,443,758 B2 * 10/2019 Dolan ..................... F16K 31/42

FOREIGN PATENT DOCUMENTS

CN 102032233 A 4/2011
CN 102305306 A 1/2012
(Continued)

OTHER PUBLICATIONS

English Translation of First Chinese Office Action for Application No. 2021103337125 (5 pages).
(Continued)

*Primary Examiner* — Dustin T Nguyen
(74) *Attorney, Agent, or Firm* — Merchant & Gould P.C.

(57) ABSTRACT

The present disclosure provides a pilot proportional control valve apparatus, an automatic calibration method, engineering machinery and a storage medium, and relates to the technical field of engineering machinery, wherein the pilot proportional control valve apparatus including a hydraulic system and a controller; the hydraulic system including: a plurality of proportional pressure reducing valves, a calibration reversing valve, and a pressure sensor; the calibration reversing valve including a plurality of reversing units, an output end of each proportional pressure reducing valve being respectively connected with an input end of one corresponding reversing unit; the pressure sensor being arranged in a detection oil path; the controller performing calibration processing on the proportional pressure reducing valve according to a pilot oil detection pressure and an output pressure value of the proportional pressure reducing valve.

17 Claims, 3 Drawing Sheets

(52) U.S. Cl.
CPC ............... *F15B 2211/50554* (2013.01); *F15B 2211/513* (2013.01); *F15B 2211/6316* (2013.01); *F15B 2211/6355* (2013.01); *F15B 2211/67* (2013.01)

(58) Field of Classification Search
CPC .......... F15B 2211/67; F15B 2211/6316; F15B 2211/6355; F15B 13/02; F15B 19/00
See application file for complete search history.

(56) References Cited

FOREIGN PATENT DOCUMENTS

| | | | |
|---|---|---|---|
| CN | 103994128 | A | 8/2014 |
| CN | 106762877 | A | 5/2017 |
| CN | 207795742 | U | 8/2018 |
| CN | 209586813 | U | 11/2019 |
| CN | 210317998 | U | 4/2020 |
| CN | 111794306 | A | 10/2020 |
| CN | 112145501 | A | 12/2020 |
| CN | 113090603 | A | 7/2021 |
| JP | 2001289202 | A | 10/2001 |
| JP | 2017190858 | A | 10/2017 |
| WO | 2015119311 | A1 | 8/2015 |

OTHER PUBLICATIONS

Chinese Search Report for Application No. 2021103337125 (1 page).
International Search Report for PCT/CN2021/120917 issued on Dec. 7, 2021 (8 pages including English Translation).
Written Opinion for for PCT/CN2021/120917 issued on Dec. 7, 2021 (6 pages).
EP Search Report for Corresp. EP App No. 21934452.0, dated Dec. 23, 2024 (10 pages).

* cited by examiner

PILOT PROPORTIONAL CONTROL VALVE APPARATUS, AUTOMATIC CALIBRATION METHOD AND MEDIUM

CROSS-REFERENCE TO RELATED APPLICATIONS

This application is a National Stage Application of International Application No. PCT/CN2021/120917, filed 27 Sep. 2021, which claims benefit of Ser. No. 202110333712.5, filed 29 Mar. 2021 in China, and which applications are incorporated herein by reference. To the extent appropriate, a claim of priority is made to each of the above disclosed applications.

TECHNICAL FIELD

The present disclosure relates to the technical field of engineering machinery, in particular to a pilot proportional control valve apparatus, an automatic calibration method, engineering machinery, and a storage medium.

BACKGROUND

In engineering machinery products, consistency needs to be guaranteed for each produced engineering machinery product, and therefore factory calibration on a hydraulic control system of the engineering machinery product is needed. With the increasing development of technology and the improvement of required technical indexes, traditional hydraulic control systems are gradually replaced with electric control systems. The hydraulic control system of the engineering machinery product comprises a pilot proportional control valve apparatus and the like, wherein a proportional pressure reducing valve and the like in the pilot proportional control valve apparatus have certain deviation in current control, easily resulting in inconsistency in actions of the products, so that a calibration method is needed to correct the deviation of the proportional pressure reducing valve and the like.

In an existing calibration method, generally, an output current of a proportional valve is controlled manually, an actual output pressure is acquired by using a sensor, it is analyzed whether the actual output pressure is within an allowable range of the deviation, and if an actual pressure value is outside the range of the deviation, one current increment is added manually, and a relationship between a new output pressure and the range of the deviation is judged until the actual output pressure value is within the allowable range of the deviation. For different actuators, it is necessary to perform calibration on the actual output pressure of the proportional valve by using a pressure signal obtained by a corresponding pressure sensor.

SUMMARY

According to a first aspect of the present disclosure, there is provided a pilot proportional control valve apparatus, comprising: a hydraulic system and a controller; the hydraulic system comprising: a plurality of proportional pressure reducing valves, a calibration reversing valve, and a pressure sensor; the calibration reversing valve comprising a plurality of reversing units, an output end of each proportional pressure reducing valve being respectively connected with an input end of one corresponding reversing unit; first output ends of the reversing units each being connected with one working oil path, and second output ends of the reversing units each being connected with one detection oil path via a connection pipeline; the pressure sensor being arranged in the detection oil path; the controller being respectively connected with the plurality of proportional pressure reducing valves, the calibration reversing valve and the pressure sensor, and configured to control the reversing unit for reversing, to input pilot oil outputted by a corresponding proportional pressure reducing valve into the detection oil path; acquire a pilot oil detection pressure acquired by the pressure sensor, and perform calibration processing on the proportional pressure reducing valve according to the pilot oil detection pressure and an output pressure value of the proportional pressure reducing valve.

In some embodiments, the hydraulic system comprises: an unloading reversing valve; the unloading reversing valve being arranged in a detection oil return oil path; both ends of the detection oil return oil path being respectively connected with the detection oil path and an oil return oil tank; the controller being communicated with the unloading reversing valve and configured to control the unloading reversing valve to unload the detection oil path.

In some embodiments, the controller is configured to output a control current to a control end of the proportional pressure reducing valve, to control an opening of the proportional pressure reducing valve so that the pilot oil outputted by the output end of the proportional pressure reducing valve has the output pressure value corresponding to the control current.

In some embodiments, the controller is configured to send a control signal to a control end of the calibration reversing valve, to control the first output end and the second output end of the reversing unit to be opened or closed, to input the pilot oil outputted by the proportional pressure reducing valve corresponding to the reversing unit into the detection oil path or the working oil path.

In some embodiments, the hydraulic system comprises: a check valve; the check valve being arranged in each connection pipeline.

In some embodiments, an input end of each proportional pressure reducing valve is connected with a pilot oil source.

In some embodiments, a damping hole is arranged in the detection oil return oil path; both ends of the detection oil return oil path being respectively connected with the detection oil path and the oil return oil tank.

According to a second aspect of the present disclosure, there is provided engineering machinery, comprising: the pilot proportional control valve apparatus as described above.

According to a third aspect of the present disclosure, there is provided an automatic calibration method based on the above pilot proportional control valve apparatus, which is applied in the controller of the pilot proportional control valve apparatus and comprises: in a calibration mode, sequentially determining one of the plurality of proportional pressure reducing valves as a to-be-calibrated proportional pressure reducing valve, and determining a target reversing unit corresponding to the to-be-calibrated proportional pressure reducing valve; controlling a first output end of the target reversing unit to be closed and a second output end of the target reversing unit to be opened, to input pilot oil outputted by the corresponding to-be-calibrated proportional pressure reducing valve into the detection oil path; acquiring a pilot oil detection pressure acquired by the pressure sensor and an output pressure value of the proportional pressure reducing valve; and performing calibration processing on the to-be-calibrated proportional pressure reducing valve according to the pilot oil detection pressure and the output pressure value.

In some embodiments, when the target reversing unit is controlled for reversing, the unloading reversing valve is controlled to be closed, so that the detection oil return oil path is disconnected.

In some embodiments, a control current is determined according to a preset pressure versus current curve; and the control current is outputted to a control end of the to-be-calibrated proportional pressure reducing valve for controlling an opening of the to-be-calibrated proportional pressure reducing valve, so that the pilot oil outputted by an output end of the to-be-calibrated proportional pressure reducing valve has the output pressure value.

The performing calibration processing on the to-be-calibrated proportional pressure reducing valve according to the pilot oil detection pressure and the output pressure value comprises: storing the pilot oil detection pressures and the output pressure values corresponding to all the to-be-calibrated proportional pressure reducing valves; when a calibration instruction is received, sequentially acquiring the pilot oil detection pressure and the output pressure value corresponding to the one to-be-calibrated proportional pressure reducing valve, and performing calibration processing on the to-be-calibrated proportional pressure reducing valve; or, after the pilot oil detection pressure and the output pressure value are acquired, performing calibration processing on the to-be-calibrated proportional pressure reducing valve.

In some embodiments, the performing calibration processing on the to-be-calibrated proportional pressure reducing valve comprises: judging whether a deviation value between the pilot oil detection pressure and the output pressure value is within a preset allowable range; if the deviation value is within the preset allowable range, ending the calibration processing on the to-be-calibrated proportional pressure reducing valve; and if the deviation value is not within the preset allowable range, determining a current compensation value, and performing calibration processing again on the to-be-calibrated proportional pressure reducing valve according to the current compensation value.

In some embodiments, the performing calibration processing again on the to-be-calibrated proportional pressure reducing valve according to the current compensation value comprises: if there is the pilot oil in the detection oil path, controlling the unloading reversing valve to be opened so that the detection oil return oil path is connected to unload the detection oil path; controlling the unloading reversing valve to be closed so that the detection oil return oil path is disconnected; determining a target reversing unit corresponding to the to-be-calibrated proportional pressure reducing valve; controlling a first output end of the target reversing unit to be closed and a second output end of the target reversing unit to be opened so that pilot oil outputted by the corresponding to-be-calibrated proportional pressure reducing valve is inputted into the detection oil path; determining a new control current according to the current compensation value, and outputting the new control current to the control end of the to-be-calibrated proportional pressure reducing valve, so that pilot oil outputted by the to-be-calibrated proportional pressure reducing valve has an output pressure value corresponding to the new control current; if the deviation value is within the preset allowable range, ending the calibration processing on the to-be-calibrated proportional pressure reducing valve; and if the deviation value is not within the preset allowable range, determining a new current compensation value, and performing calibration processing again on the to-be-calibrated proportional pressure reducing valve according to the new current compensation value until the deviation value is within the allowable range.

In some embodiments, in a working mode, the second output end of the target reversing unit is controlled to be closed and the first output end of the target reversing unit is controlled to be opened, so that the pilot oil outputted by the corresponding proportional pressure reducing valve is inputted into the working oil path.

In some embodiments, in the working mode, the unloading reversing valve is controlled to be closed, so that the detection oil return oil path is disconnected.

According to a fourth aspect of the present disclosure, there is provided a computer-readable storage medium having thereon stored computer instructions which, when executed by a processor, implement the method as described above.

BRIEF DESCRIPTION OF THE DRAWINGS

In order to more clearly illustrate embodiments of the present disclosure or technical solutions in the related art, the drawings that need to be used in the description of the embodiments or related art will be briefly described below. It is obvious that the drawings described below are only some embodiments of the present disclosure, and for one of ordinary skill in the art, other drawings may also be obtained according to these drawings without paying out creative efforts.

DETAILED DESCRIPTION

More comprehensive description of the present disclosure will be made below with reference to the accompanying drawings, in which exemplary embodiments of the present disclosure are shown. The technical solutions in the embodiments of the present disclosure will be clearly and completely described below in conjunction with the drawings in the embodiments of the present disclosure, and it is obvious that the embodiments described are only some embodiments of the present disclosure, rather than all embodiments. All other embodiments, which are obtained by one of ordinary skill in the art based on the embodiments of the present disclosure without making any creative labor, shall fall within the protection scope of the present disclosure. The technical solution of the present disclosure will be described in various aspects below in conjunction with the various drawings and embodiments.

In the related art known to the inventors, an existing calibration method of a pilot proportional control valve apparatus has the following disadvantages:

1. low calibration efficiency: different actuators need to be configured with different sensors to achieve detection of a proportional valve pressure, and calibration is performed according to an actual pressure value; and the number of the sensors affects difficulty in configuration of a signal receiving device, causing longer preparation time for the calibration, so that operation efficiency of the calibration is affected;
2. high investment cost: a large number of sensors need to be mounted to meet a requirement for the calibration, so that greater economic investment is brought;
3. poor mounting compatibility: since the large number of sensors need to be mounted, requirements for space and layout of a hydraulic system are high; and
4. low calibration precision: there are a large number of to-be-calibrated actuators, so that manual calibration results in low precision and a waste of time.

In view of this, one technical problem to be solved by the present invention is to provide a pilot proportional control valve apparatus, an automatic calibration method, engineering machinery, and a storage medium, capable of continuously and automatically calibrating all proportional pressure reducing valves, so that calibration efficiency is greatly improved; when factory calibration is performed on a plurality of proportional pressure reducing valves, only one pressure sensor needs to be configured, so that calibration and detection cost can be reduced.

Figure 1:
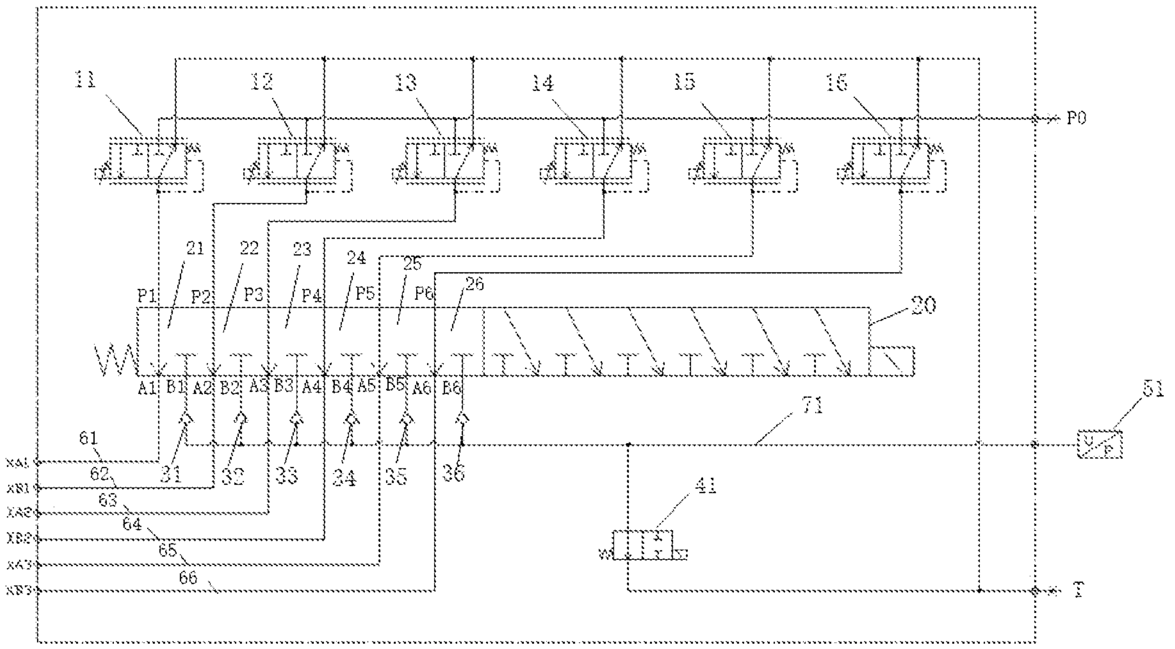
FIG. 1 is a schematic diagram of a hydraulic system in some embodiments of a pilot proportional control valve apparatus provided according to the present disclosure.
Figure 2:
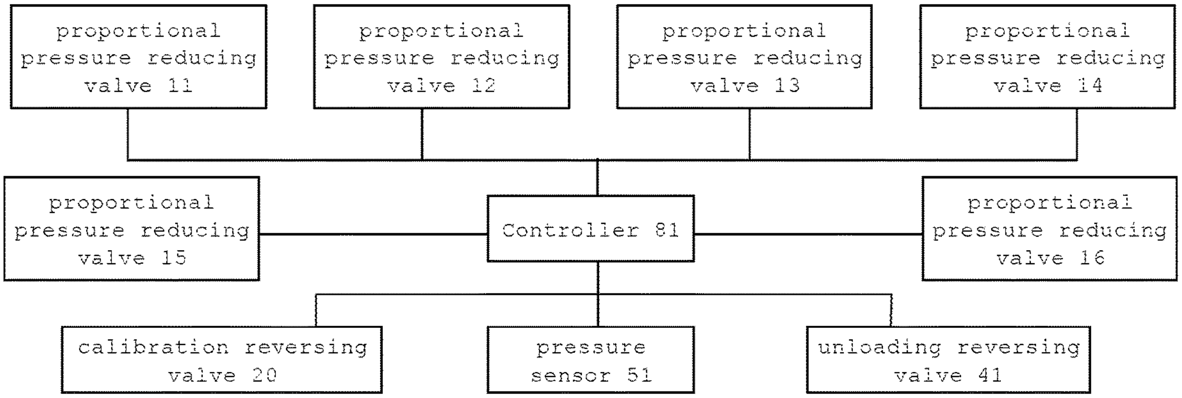
FIG. 2 is a control schematic diagram of a controller in some embodiments of a pilot proportional control valve apparatus provided according to the present disclosure.
Figure 3:
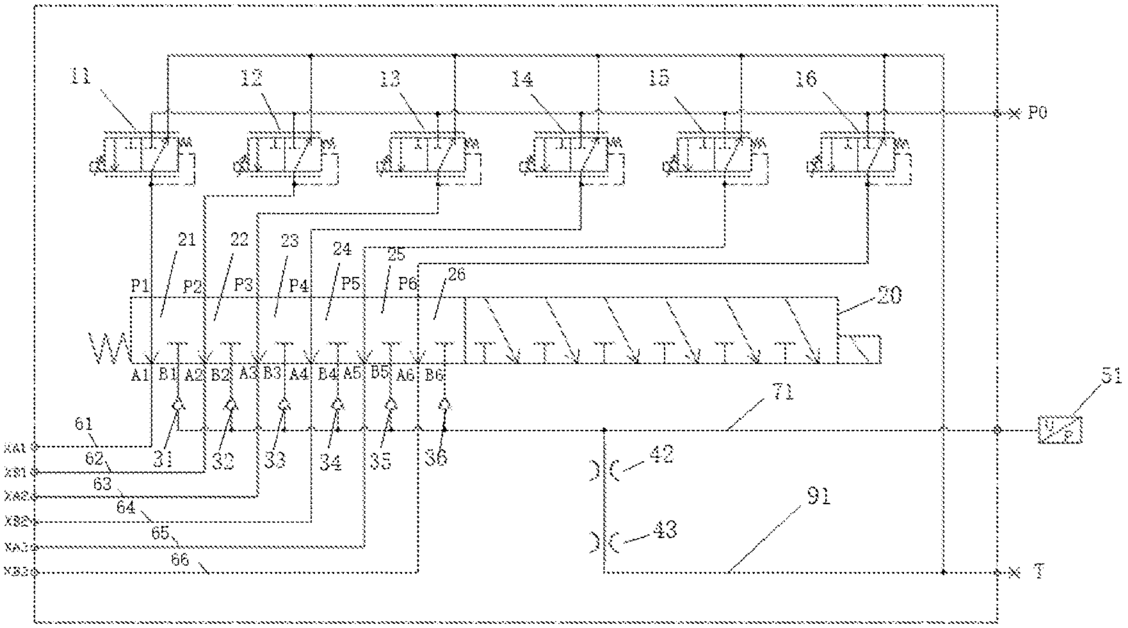
FIG. 3 is a hydraulic schematic diagram in other embodiments of a pilot proportional control valve apparatus provided according to the present disclosure.

In some embodiments, as shown in FIGS. 1 to 3, the present disclosure provides a pilot proportional control valve apparatus, which may be a pilot proportional control valve bank. The pilot proportional control valve apparatus comprises a hydraulic system and a controller 81. The hydraulic system comprises: a plurality of proportional pressure reducing valves, a calibration reversing valve 20 and a pressure sensor 51. The number of the proportional pressure reducing valves varies according to the pilot proportional control valve apparatus, for example, the number of the proportional pressure reducing valves may be 5, 6, 7, etc., and the valves may be existing proportional pressure reducing valves. The present disclosure is described by taking six proportional pressure reducing valves as an example.

The six proportional pressure reducing valves comprise a proportional pressure reducing valve 11, a proportional pressure reducing valve 12, a proportional pressure reducing valve 13, a proportional pressure reducing valve 14, a proportional pressure reducing valve 15, and a proportional pressure reducing valve 16. The calibration reversing valve 20, which is a multi-way reversing valve, comprises a plurality of reversing units that comprise a reversing unit 21, a reversing unit 22, a reversing unit 23, a reversing unit 24, a reversing unit 25, a reversing unit 26, and the like.

Output ends of the proportional pressure reducing valve 11, the proportional pressure reducing valve 12, the proportional pressure reducing valve 13, the proportional pressure reducing valve 14, the proportional pressure reducing valve 15 and the proportional pressure reducing valve 16 are respectively connected with an input end P1 of the corresponding reversing unit 21, an input end P2 of the reversing unit 22, an input end P3 of the reversing unit 23, an input end P4 of the reversing unit 24, an input end P5 of the reversing unit 25 and an input end P6 of the reversing unit 26. Input ends of the proportional pressure reducing valve 11, the proportional pressure reducing valve 12, the proportional pressure reducing valve 13, the proportional pressure reducing valve 14, the proportional pressure reducing valve 15, and the proportional pressure reducing valve 16 are all connected with a pilot oil source.

A first output end A1 of the reversing unit 21 is connected with a working oil path 61, a first output end A2 of the reversing unit 22 is connected with a working oil path 62, a first output end A3 of the reversing unit 23 is connected with a working oil path 63, a first output end A4 of the reversing unit 24 is connected with a working oil path 64, a first output end A5 of the reversing unit 25 is connected with a working oil path 65, and a first output end A6 of the reversing unit 26 is connected with a working oil path 66.

A second output end B1 of the reversing unit 21, a second output end B2 of the reversing unit 22, a second output end B3 of the reversing unit 23, a second output end B4 of the reversing unit 24, a second output end B5 of the reversing unit 25, and a second output end B6 of the reversing unit 26 are all connected with one detection oil path 71 via a connection pipeline. The pressure sensor 51 is arranged in the detection oil path 71. An unloading reversing valve 41 is arranged in a detection oil return oil path 91, both ends of which are respectively connected with the detection oil path 71 and an oil return oil tank.

As shown in FIG. 3, damping holes 42 and 43 are arranged in the detection oil return oil path 91. Hydraulic unloading may be controlled by using a two-position two-way solenoid valve (unloading reversing valve 41), or by providing a damping hole, wherein the unloading reversing valve 41 may be replaced with the damping holes 42 and 43 for unloading of a detection loop. The damping holes 42 and 43 may be existing damping holes.

The controller 81 is respectively connected with the proportional pressure reducing valve 11, the proportional pressure reducing valve 12, the proportional pressure reducing valve 13, the proportional pressure reducing valve 14, the proportional pressure reducing valve 15, the proportional pressure reducing valve 16, the calibration reversing valve 20, the pressure sensor 51, and the unloading reversing valve 41. The controller 81 controls the reversing unit 21, the reversing unit 22, the reversing unit 23, the reversing unit 24, the reversing unit 25, or the reversing unit 26 for reversing, so that pilot oil outputted by the corresponding proportional pressure reducing valve 11, proportional pressure reducing valve 12, proportional pressure reducing valve 13, proportional pressure reducing valve 14, proportional pressure reducing valve 15, or proportional pressure reducing valve 16 is inputted into the detection oil path 71.

The controller 81 acquires a pilot oil detection pressure acquired by the pressure sensor 51, and performs calibration processing on the proportional pressure reducing valve 11, the proportional pressure reducing valve 12, the proportional pressure reducing valve 13, the proportional pressure reducing valve 14, the proportional pressure reducing valve 15, or the proportional pressure reducing valve 16, according to the pilot oil detection pressure and an output pressure value of the proportional pressure reducing valve 11, the proportional pressure reducing valve 12, the proportional pressure reducing valve 13, the proportional pressure reducing valve 14, the proportional pressure reducing valve 15, or the proportional pressure reducing valve 16.

The controller 81 controls the unloading reversing valve 41 to unload the detection oil path 71. The controller 81 outputs a control current to a control end of the proportional pressure reducing valve 11, the proportional pressure reducing valve 12, the proportional pressure reducing valve 13, the proportional pressure reducing valve 14, the proportional pressure reducing valve 15, or the proportional pressure reducing valve 16, to control an opening of the proportional pressure reducing valve 11, the proportional pressure reducing valve 12, the proportional pressure reducing valve 13, the proportional pressure reducing valve 14, the proportional pressure reducing valve 15, or the proportional pressure reducing valve 16, so that the pilot oil outputted by the output end of the proportional pressure reducing valve 11, the proportional pressure reducing valve 12, the proportional pressure reducing valve 13, the proportional pressure reducing valve 14, the proportional pressure reducing valve 15, or the proportional pressure reducing valve 16 has an output pressure value corresponding to the control current.

The controller 81 sends a control signal to a control end of the calibration reversing valve 20, to control the first output end and the second output end of the reversing unit 21, the reversing unit 22, the reversing unit 23, the reversing unit 24, the reversing unit 25, or the reversing unit 26 to be opened or closed, so that the pilot oil outputted by the proportional pressure reducing valve 11, the proportional pressure reducing valve 12, the proportional pressure reducing valve 13, the proportional pressure reducing valve 14, the proportional pressure reducing valve 15, or the proportional pressure reducing valve 16, which respectively corresponds to the reversing unit 21, the reversing unit 22, the reversing unit 23, the reversing unit 24, the reversing unit 25, or the reversing unit 26, is inputted into the detection oil path 71 or the corresponding working oil path.

The hydraulic system further comprises a check valve 31, a check valve 32, a check valve 33, a check valve 34, a check valve 35 and a check valve 36. The check valve 31, the check valve 32, the check valve 33, the check valve 34, the check valve 35, and the check valve 36 are respectively provided in the connection pipelines between the second output end B1 of the reversing unit 21, the second output end B2 of the reversing unit 22, the second output end B3 of the reversing unit 23, the second output end B4 of the reversing unit 24, the second output end B5 of the reversing unit 25, the second output end B6 of the reversing unit 26, and the detection oil path 71.

In some embodiments, in an oil feed loop of the hydraulic system, a power source is provided for the hydraulic system by a pilot oil pressure P0. A pilot oil path is provided with the proportional pressure reducing valve 11, the proportional pressure reducing valve 12, the proportional pressure reducing valve 13, the proportional pressure reducing valve 14, the proportional pressure reducing valve 15, and the proportional pressure reducing valve 16 for factory calibration. The proportional pressure reducing valve 11, the proportional pressure reducing valve 12, the proportional pressure reducing valve 13, the proportional pressure reducing valve 14, the proportional pressure reducing valve 15, and the proportional pressure reducing valve 16 respectively provide a pilot pressure to a main valve via a port XA1 of the working oil path 61, a port XB1 of the working oil path 62, a port XA2 of the working oil path 63, a port XB2 of the working oil path 64, a port XA3 of the working oil path 65, and a port XB3 of the working oil path 66.

The calibration reversing valve 20 is used for controlling whether the pilot oil enters each working oil path or the detection oil path 71, wherein the pilot oil enters each working oil path for achieving control of the pilot proportional control valve apparatus for the main valve; and the pilot oil enters the detection oil path 71 for achieving automatic calibration of the proportional pressure reducing valve.

When the automatic calibration is performed, the check valve 31, the check valve 32, the check valve 33, the check valve 34, the check valve 35, and the check valve 36 are used for preventing interference with the detection oil path 71 by other five pilot oil paths, so that a calibration result is not affected. The detection oil return oil path 91 is provided with the unloading reversing valve 41, which is used for, when calibrating different proportional pressure reducing valves, unloading the detection oil path 71 in advance to ensure calibration precision. The other side of the detection oil path 71 is provided with the pressure sensor 51, which is used for detecting a calibration pressure.

In some embodiments, an oil feed oil path of the calibration reversing valve 20 is, inside the valve body, divided into six loops, which respectively form the reversing unit 21, the reversing unit 22, the reversing unit 23, the reversing unit 24, the reversing unit 25 and the reversing unit 26, each reversing unit being communicated with one proportional pressure reducing valve.

Oil feed inlets of the proportional pressure reducing valve 11, the proportional pressure reducing valve 12, the proportional pressure reducing valve 13, the proportional pressure reducing valve 14, the proportional pressure reducing valve 15 and the proportional pressure reducing valve 16 are communicated with the pilot oil P0 (pilot oil source), the controller 81 controls the control end of the proportional pressure reducing valve 11, the proportional pressure reducing valve 12, the proportional pressure reducing valve 13, the proportional pressure reducing valve 14, the proportional pressure reducing valve 15 or the proportional pressure reducing valve 16, and the proportional pressure reducing valve 11, the proportional pressure reducing valve 12, the proportional pressure reducing valve 13, the proportional pressure reducing valve 14, the proportional pressure reducing valve 15 or the proportional pressure reducing valve 16 outputs a corresponding pressure according to the control current outputted by the controller 81, so that the pilot oil P0 supplies oil to the calibration reversing valve 20.

A control end of the unloading reversing valve 41 is activated so that an oil return oil path of the pilot oil to the oil tank is closed. The control end of the calibration reversing valve 20 is activated so that the working oil path to the main valve is closed, and pressure oil outputted by one proportional pressure reducing valve is supplied to the detection oil path 71. An output pressure of the proportional pressure reducing valve is acquired by the pressure sensor 51.

Through an internal program of the controller 81, it is judged whether a difference between a target output pressure corresponding to the control current outputted by the controller 81 and the actual pressure acquired by the pressure sensor 51 is within a tolerance range, and according to the result, it is judged whether calibration on the proportional pressure reducing valve needs to be performed again. After the calibration is ended or the program judges that the calibration is not needed, the unloading reversing valve 41 is powered off, and the detection loop 71 is communicated with a port T (connected to the oil return oil tank) to achieve pressure unloading. When calibration is performed again on other proportional pressure reducing valves, the unloading reversing valve 41 is powered on. The above calibration steps are repeated, and again and again, calibration on all the proportional pressure reducing valves can be completed.

In some embodiments, the present disclosure provides engineering machinery, comprising the pilot proportional control valve apparatus in any of the above embodiments. There are various engineering machinery such as an excavator and the like.

Figure 4:
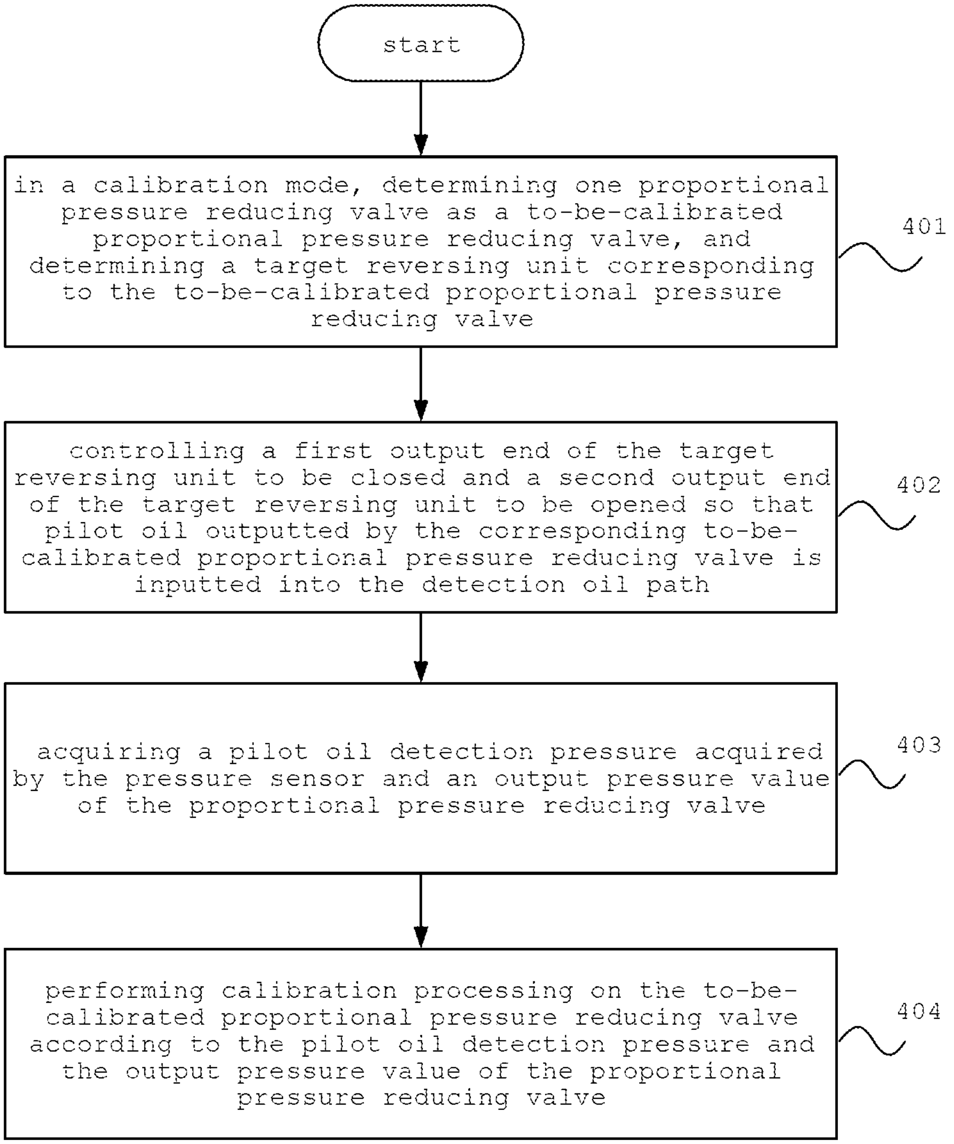
FIG. 4 is a flow schematic diagram in some embodiments of an automatic calibration method provided according to the present disclosure.

In some embodiments, the present disclosure provides an automatic calibration method based on the pilot proportional control valve apparatus in the above embodiments, which is applied in the controller of the pilot proportional control valve apparatus. FIG. 4 is a flow schematic diagram in some embodiments of an automatic calibration method according to the present disclosure, as shown in FIG. 4:

Step 401, in a calibration mode, determining one proportional pressure reducing valve as a to-be-calibrated proportional pressure reducing valve, and determining a target reversing unit corresponding to the to-be-calibrated proportional pressure reducing valve.

Step 402, controlling a first output end of the target reversing unit to be closed and a second output end of the target reversing unit to be opened so that pilot oil outputted by the corresponding to-be-calibrated proportional pressure reducing valve is inputted into the detection oil path.

Step 403, acquiring a pilot oil detection pressure acquired by the pressure sensor and an output pressure value of the proportional pressure reducing valve.

Step 404, performing calibration processing on the to-be-calibrated proportional pressure reducing valve according to the pilot oil detection pressure and the output pressure value of the proportional pressure reducing valve.

The calibration processing on the to-be-calibrated proportional pressure reducing valve may be performed by using various methods. After a pilot oil detection pressure and an output pressure value of one to-be-calibrated proportional pressure reducing valve are acquired, calibration processing is immediately performed on the to-be-calibrated proportional pressure reducing valve. In the calibration mode, one of the plurality of proportional pressure reducing valves is sequentially determined as a to-be-calibrated proportional pressure reducing valve and subjected to the calibration processing, and the calibration processing is performed cyclically for continuous automatic calibration on the plurality of proportional pressure reducing valves.

Alternatively, the pilot oil detection pressure and the output pressure value corresponding to each to-be-calibrated proportional pressure reducing valve are stored, that is, the pilot oil detection pressures and the output pressure values of all the to-be-calibrated proportional pressure reducing valves are stored. When a calibration instruction is received, a pilot oil detection pressure and an output pressure value corresponding to one to-be-calibrated proportional pressure reducing valve are sequentially acquired, and calibration processing is performed on the to-be-calibrated proportional pressure reducing valve. After calibration processing is performed on the one to-be-calibrated proportional pressure reducing valve, a pilot oil detection pressure and an output pressure value corresponding to a next to-be-calibrated proportional pressure reducing valve are acquired, and calibration processing is performed on the next to-be-calibrated proportional pressure reducing valve until calibration processing is performed on all the to-be-calibrated proportional pressure reducing valves.

In some embodiments, when the target reversing unit is controlled for reversing, the unloading reversing valve is controlled to be closed, so that the detection oil return oil path is disconnected. A control current is determined according to a preset pressure versus current curve, and the control current is outputted to a control end of the to-be-calibrated proportional pressure reducing valve for controlling an opening of the to-be-calibrated proportional pressure reducing valve, so that the pilot oil outputted by an output end of the to-be-calibrated proportional pressure reducing valve has the output pressure value.

Calibration processing on the to-be-calibrated proportional pressure reducing valve can be performed by using various methods. for example, it is judged whether a deviation value between the pilot oil detection pressure and the output pressure value is within a preset allowable range, if the deviation value is within the preset allowable range, the calibration processing on the to-be-calibrated proportional pressure reducing valve is ended, and if the deviation value is not within the preset allowable range, a current compensation value is determined, and calibration processing is performing again on the to-be-calibrated proportional pressure reducing valve according to the current compensation value.

The calibration processing on the to-be-calibrated proportional pressure reducing valve according to the current compensation value can be performed again by using various methods. For example, if there is the pilot oil in the detection oil path, the unloading reversing valve is controlled to be opened so that the detection oil return oil path is connected to unload the detection oil path; the unloading reversing valve is controlled to be closed so that the detection oil return oil path is disconnected; a target reversing unit corresponding to the to-be-calibrated proportional valve is determined; a first output end of the target reversing unit is controlled to be closed and a second output end of the target reversing unit is controlled to be opened so that pilot oil outputted by the corresponding to-be-calibrated proportional pressure reducing valve is inputted into the detection oil path; and a new control current is determined according to the current compensation value, and the new control current is outputted to a control end of the to-be-calibrated proportional pressure reducing valve so that pilot oil outputted by the to-be-calibrated proportional pressure reducing valve has an output pressure value corresponding to the new control current.

If a deviation value is within the preset allowable range, the calibration processing on the to-be-calibrated proportional pressure reducing valve is ended; and if a deviation value is not within the preset allowable range, a new current compensation value is determined, and calibration processing on the to-be-calibrated proportional pressure reducing valve is performed again according to the new current compensation value until the deviation value is within the allowable range.

In a working mode, the second output end of the target reversing unit is controlled to be closed and the first output end of the target reversing unit is controlled to be opened, so that the pilot oil outputted by the corresponding proportional pressure reducing valve is inputted into the working oil path. In the working mode, the unloading reversing valve is controlled to be closed, so that the detection oil return oil path is disconnected.

In some embodiments, the automatic calibration on the proportional pressure reducing valve is illustrated by taking the proportional pressure reducing valve 11 as an example:

Step 1, controlling, by the controller 81, the reversing unit 21 of the calibration reversing valve 20 for reversing and the unloading reversing valve 41 to be powered on for reversing, so that the detection oil return oil path 91 is closed to control the output end of the proportional pressure reducing valve 11 to supply oil to the detection oil path 71. The controller 81 controls the proportional pressure reducing valve 11 to output a preset calibration pressure through the internal program, the controller 81 outputs a corresponding control current to the proportional pressure reducing valve 11 according to the default pressure versus current curve through the internal program, so that an electromagnet in the proportional pressure reducing valve 11 is powered on and outputs a corresponding pressure. The pressure sensor 51 acquires an actual pressure outputted by the proportional pressure reducing valve 11.

Step 2, when there is a deviation between an actual pressure value acquired by the pressure sensor 51 and an output pressure value (which is a target pressure value corresponding to the control current outputted by the controller 81) of the proportional pressure reducing valve 11 and a deviation value is not within the allowable range, obtaining, by the controller 81, a current compensation value through an automatic calibration program.

The controller 81 controls the unloading reversing valve 41 to be powered off for reversing and unloading, and after the unloading, the unloading reversing valve 41 is powered on again to a reversing position, so that the controller 81 outputs a compensated control current again according to a target pressure through the calibration program, and the electromagnet of the proportional pressure reducing valve 11 is powered on again to output a corresponding pressure.

The pressure sensor 51 detects an actual pressure outputted by the proportional pressure reducing valve 11 again; it is calculated again whether a difference value between an actual pressure value acquired by the pressure sensor 51 and an output pressure value of the proportional pressure reducing valve 11 is within the allowable range, and if the difference value is not within the specified tolerance range, the step 2 is performed again until the deviation between the actual pressure value acquired by the pressure sensor 51 and the output pressure value of the proportional pressure reducing valve 11 falls within the tolerance range.

Before the automatic calibration on the proportional pressure reducing valve 12, the controller 81 controls the unloading valve 41 to be powered off and the detection loop (oil path) 71 to unload pressure, and after a certain time, the controller 81 controls the unloading valve 41 to be powered on to a closing position, to make a detection preparation for the calibration on the proportional pressure reducing valve 12. By adopting the above steps 1 to 2 in the automatic calibration method for the proportional pressure, reducing valve 11, automatic continuous calibration on the proportional pressure reducing valve 12, the proportional pressure reducing valve 13, the proportional pressure reducing valve 14, the proportional pressure reducing valve 15, and the proportional pressure reducing valve 16 is sequentially performed for calibration of the actual pressure factory value.

In some embodiments, the automatic calibration on the proportional pressure reducing valves 11 to 16 is performed in a centralized manner:

Step 1, controlling, by the controller 81, the reversing unit 21 of the calibration reversing valve 20 for reversing and the unloading reversing valve 41 to be powered on for reversing, so that the detection oil return oil path 91 is closed to control the output end of the proportional pressure reducing valve 11 to supply oil to the detection oil path 71. The controller 81 controls the proportional pressure reducing valve 11 to output a preset calibration pressure through the internal program, and the controller 81 outputs a corresponding control current to the proportional pressure reducing valve 11 according to the default pressure versus current curve through the internal program, so that an electromagnet in the proportional pressure reducing valve 11 is powered on and outputs a corresponding pressure. The pressure sensor 51 acquires an actual pressure outputted by the proportional pressure reducing valve 11. The controller 81 stores an actual pressure value and an output pressure value corresponding to the proportional pressure reducing valve 11 in a storage module.

Step 2, repeating the control operation based on the step 1, so that the controller 81 stores actual pressure values and output pressure values corresponding to the proportional pressure reducing valves 12 to 16 in the storage module.

Step 3, receiving, by the controller 81, a calibration instruction and acquiring, from the storage module, the actual pressure value and the output pressure value corresponding to the proportional pressure reducing valve 11.

Step 4, when there is a deviation between the actual pressure value corresponding to the proportional pressure reducing valve 11 and the output pressure value (which is the target pressure value corresponding to the control current outputted by the controller 81) corresponding to the proportional pressure reducing valve 11 and a deviation value is not within the allowable range, obtaining, by the controller 81, a current compensation value through the automatic calibration program.

The controller 81 controls the unloading reversing valve 41 to be closed and controls the output end of the proportional pressure reducing valve 11 to supply oil to the detection oil path 71. The controller 81 outputs a compensated control current again according to a target pressure through the calibration program, and an electromagnet of the proportional pressure reducing valve 11 is powered on again to output a corresponding pressure.

The pressure sensor 51 detects an actual pressure outputted by the proportional pressure reducing valve 11 again; it is calculated again whether a difference value between an actual pressure value acquired by the pressure sensor 51 and an output pressure value of the proportional pressure reducing valve 11 is within the allowable range, and if the difference value is not within the specified tolerance range, the step 4 is performed again until the deviation between the actual pressure value acquired by the pressure sensor 51 and the output pressure value of the proportional pressure reducing valve 11 falls within the tolerance range.

By adopting the above steps 3 and 4 in the calibration method for the proportional pressure, reducing valve 11, the calibration on the proportional pressure reducing valve 12, the proportional pressure reducing valve 13, the proportional pressure reducing valve 14, the proportional pressure reducing valve 15, and the proportional pressure reducing valve 16 is sequentially performed for calibration of the actual pressure factory value.

In some embodiments, the present disclosure provides a computer-readable storage medium having thereon stored computer instructions which, when executed by a processor, implement the automatic calibration method in any of the above embodiments.

The pilot proportional control valve apparatus, the automatic calibration method, the engineering machinery and the storage medium provided in the above embodiments can solve the following technical problems: an excessive number of pressure sensors for calibrating the actual pressure factory value of the proportional pressure reducing valves; increase in mounting costs due to the large number of sensors; and low working efficiency due to a complex process of the calibration method.

It should be appreciated by those skilled in the art that, the embodiments of the present disclosure may be provided as a method, system, or computer program product. Accordingly, the present disclosure may take a form of an entire hardware embodiment, an entire software embodiment or an embodiment combining software and hardware aspects. Furthermore, the present disclosure may take a form of a computer program product implemented on one or more computer-available non-transitory storage media (including, but not limited to, a disk memory, CD-ROM, optical memory, etc.) having computer-usable program code embodied therein.

The present disclosure is described with reference to flow diagrams and/or block diagrams of the method, apparatus (system) and computer program product according to the embodiments of the present disclosure. It should be understood that each flow and/or block of the flow diagrams and/or block diagrams, and a combination of flows and/or blocks in the flow diagrams and/or block diagrams, can be implemented by computer program instructions. These computer program instructions may be provided to a processor of a general-purpose computer, special-purpose computer, embedded processor, or other programmable data processing apparatuses to produce a machine, such that the instructions, which are executed via the processor of the computer or other programmable data processing apparatuses, create means for implementing functions specified in one or more flows of the flow diagrams and/or one or more blocks of the block diagrams.

These computer program instructions may also be stored in a computer-readable memory that can guide a computer or other programmable data processing apparatuses to work in a specific manner, such that the instructions stored in the computer-readable memory produce an article of manufacture including instruction means which implement the functions specified in one or more flows of the flow diagrams and/or one or more blocks of the block diagrams.

The pilot proportional control valve apparatus, the automatic calibration method, the engineering machinery and the storage medium provided in the above embodiments can achieve automatic calibration on all the proportional pressure reducing valves, so that calibration efficiency is greatly improved; when factory calibration is performed on the plurality of proportional pressure reducing valves, only one pressure sensor needs to be provided, so that calibration detection cost can be reduced; complete machine test and assembly can save resources, and reduce cost of the complete machine test.

The method and system of the present disclosure may be implemented in a number of manners. For example, the method and system of the present disclosure may be implemented in software, hardware, firmware, or any combination of software, hardware, and firmware. The above order for the steps of the method is for illustration only, and the steps of the method of the present disclosure are not limited to the order specifically described above unless specifically stated otherwise. Furthermore, in some embodiments, the present disclosure may also be implemented as programs recorded in a recording medium, the programs including machine-readable instructions for implementing the method according to the present disclosure. Therefore, the present disclosure also covers a recording medium storing a program for performing the method according to the present disclosure.

The description of the present disclosure has been presented for purposes of examples and description, and is not intended to be exhaustive or limit this disclosure to the form disclosed. Many modifications and variations are apparent to one of ordinary skill in the art. The selection and description of the embodiments are to better explain the principles and practical applications of the present disclosure, and to enable one of ordinary skill in the art to understand the present disclosure and therefore design various embodiments with various modifications suitable for a specific purpose.

What is claimed is:

1. A pilot proportional control valve apparatus, comprising:

a hydraulic system and a controller; the hydraulic system comprising: a plurality of proportional pressure reducing valves, a calibration reversing valve, and a pressure sensor; the calibration reversing valve comprising a plurality of reversing units, an output end of each proportional pressure reducing valve being respectively connected with an input end of one corresponding reversing unit; first output ends of the reversing units each being connected with one working oil path, and second output ends of the reversing units each being connected with one detection oil path via a connection pipeline; the pressure sensor being arranged in the detection oil path;

the controller being respectively connected with the plurality of proportional pressure reducing valves, the calibration reversing valve and the pressure sensor, and configured to control the reversing unit for reversing, to input pilot oil outputted by a corresponding one of the plurality of proportional pressure reducing valves into the detection oil path; acquire a pilot oil detection pressure acquired by the pressure sensor, and perform calibration processing on the corresponding one proportional pressure reducing valve according to the pilot oil detection pressure and an output pressure value of the corresponding one proportional pressure reducing valve.

2. The pilot proportional control valve apparatus according to claim 1, wherein the hydraulic system comprises: an unloading reversing valve;

the unloading reversing valve being arranged in a detection oil return oil path; of the detection oil return oil path is connected to the detection oil path at a first end and is connected to an oil return oil tank at a second end;

the controller being communicated with the unloading reversing valve and configured to control the unloading reversing valve to unload the detection oil path.

3. The pilot proportional control valve apparatus according to claim 2, wherein the controller is configured to output a control current to a control end of the corresponding one proportional pressure reducing valve, to control an opening of the corresponding one proportional pressure reducing valve so that the pilot oil outputted by the output end of the corresponding one proportional pressure reducing valve has the output pressure value corresponding to the control current.

4. The pilot proportional control valve apparatus according to claim 3, wherein the controller is configured to send a control signal to a control end of the calibration reversing valve, to control the first output end and the second output end of the reversing unit to be opened or closed, to input the pilot oil outputted by the proportional pressure reducing valve corresponding to the reversing unit into the detection oil path or the working oil path.

5. The pilot proportional control valve apparatus according to claim 2, wherein the hydraulic system comprises: a check valve; the check valve being arranged in each connection pipeline.

6. The pilot proportional control valve apparatus according to claim 2, wherein an input end of each proportional pressure reducing valve is connected with a pilot oil source.

7. The pilot proportional control valve apparatus according to claim 1, wherein a damping hole is arranged in the detection oil return oil path.

8. Engineering machinery, comprising:

the pilot proportional control valve apparatus according to claim 1.

9. An automatic calibration method based on the pilot proportional control valve apparatus of claim 2, which is applied to the controller of the pilot proportional control valve apparatus and comprises:

sequentially determining one of the plurality of proportional pressure reducing valves as a to-be-calibrated proportional pressure reducing valve, and determining a target reversing unit corresponding to the to-be-calibrated proportional pressure reducing valve in a calibration mode;

controlling a first output end of the target reversing unit to be closed and a second output end of the target reversing unit to be opened, to input pilot oil outputted by the corresponding to-be-calibrated proportional pressure reducing valve into the detection oil path;

acquiring a pilot oil detection pressure acquired by the pressure sensor and an output pressure value of the proportional pressure reducing valve; and performing calibration processing on the to-be-calibrated proportional pressure reducing valve according to the pilot oil detection pressure and the output pressure value.

10. The method according to claim 9, further comprising:

controlling the unloading reversing valve to be closed, so that the detection oil return oil path is disconnected, when the target reversing unit is controlled for reversing.

11. The method according to claim 10, further comprising: determining a control current according to a preset pressure versus current curve; and outputting the control current to a control end of the to-be-calibrated proportional pressure reducing valve for controlling an opening of the to-be-calibrated proportional pressure reducing valve, so that the pilot oil outputted by an output end of the to-be-calibrated proportional pressure reducing valve has the output pressure value.

12. The method according to claim 11, wherein the performing calibration processing on the to-be-calibrated proportional pressure reducing valve according to the pilot oil detection pressure and the output pressure value comprises:

storing the pilot oil detection pressures and the output pressure values corresponding to all the to-be-calibrated proportional pressure reducing valves;

sequentially acquiring the pilot oil detection pressure and the output pressure value corresponding to the one to-be-calibrated proportional pressure reducing valve, and performing calibration processing on the to-be-calibrated proportional pressure reducing valve, when a calibration instruction is received;

or, performing calibration processing on the to-be-calibrated proportional pressure reducing valve, after the pilot oil detection pressure and the output pressure value are acquired.

13. The method according to claim 12, wherein the performing calibration processing on the to-be-calibrated proportional pressure reducing valve comprises:

judging whether a deviation value between the pilot oil detection pressure and the output pressure value is within a preset allowable range;

ending the calibration processing on the to-be-calibrated proportional pressure reducing valve, if the deviation value is within the preset allowable range; and determining a current compensation value, and performing calibration processing again on the to-be-calibrated proportional pressure reducing valve according to the current compensation value, if the deviation value is not within the preset allowable range.

14. The method according to claim 13, wherein the performing calibration processing again on the to-be-calibrated proportional pressure reducing valve according to the current compensation value comprises:

controlling the unloading reversing valve to be opened, so that the detection oil return oil path is connected to unload the detection oil path, if there is the pilot oil in the detection oil path;

controlling the unloading reversing valve to be closed so that the detection oil return oil path is disconnected;

determining a target reversing unit corresponding to the to-be-calibrated proportional pressure reducing valve;

controlling a first output end of the target reversing unit to be closed and a second output end of the target reversing unit to be opened so that pilot oil outputted by the corresponding to-be-calibrated proportional pressure reducing valve is inputted into the detection oil path;

determining a new control current according to the current compensation value, and outputting the new control current to the control end of the to-be-calibrated proportional pressure reducing valve, so that pilot oil outputted by the to-be-calibrated proportional pressure reducing valve has an output pressure value corresponding to the new control current; if the deviation value is within the preset allowable range, ending the calibration processing on the to-be-calibrated proportional pressure reducing valve; and determining a new current compensation value, and performing calibration processing again on the to-be-calibrated proportional pressure reducing valve according to the new current compensation value until the deviation value is within the allowable range, if the deviation value is not within the preset allowable range.

15. The method according to claim 9, further comprising:

controlling the second output end of the target reversing unit to be closed and the first output end of the target reversing unit to be opened in a working mode, to input the pilot oil outputted by the corresponding proportional pressure reducing valve into the working oil path.

16. The method according to claim 15, further comprising:

controlling the unloading reversing valve to be closed in the working mode, to disconnect the detection oil return oil path.

17. A computer-readable storage medium having thereon stored computer instructions which, when executed by a processor, implement the method according to claim 9.

* * * * *